United States Patent

[11] 3,582,565

[72] Inventors Robert H. Beeman
River Forest;
Robert V. Burns, Tinley Park; Robert T. Cleary, Lockport, Ill.
[21] Appl. No. 790,671
[22] Filed Jan. 13, 1969
[45] Patented June 1, 1971
[73] Assignee Automatic Electric Laboratories, Inc.
Northlake, Ill.

[54] TOME CHANNELS FOR MULTIFREQUENCY RECEIVERS
2 Claims, 9 Drawing Figs.

[52] U.S. Cl. .......... 179/84, 340/171
[51] Int. Cl. .......... H04m 1/50, H04q 9/12
[50] Field of Search .......... 179/84 (UF); 340/171; 325/379; 333/70

[56] References Cited
UNITED STATES PATENTS

| | | | |
|---|---|---|---|
| 2,203,465 | 6/1940 | Landon | 325/379 |
| 2,934,722 | 4/1960 | Van Anrooy | 333/70 |
| 2,997,672 | 8/1961 | Reinsmith | 222/70 |
| 3,320,576 | 5/1967 | Dixon et al. | 340/171 |

*Primary Examiner*—William C. Cooper
*Assistant Examiner*—William A. Helvestine
*Attorneys*—B. E. Franz, Glenn H. Antrim, Cyril A. Krenzer and K. Mullerheim

ABSTRACT: A tone channel of the type used in multifrequency receivers has in cascade an input band-pass filter that has a frequency curve similar to that of overcoupled filters, a limiter-amplifier, and an output band-pass filter that has narrow band-pass characteristics. The center frequency of both filters is the frequency of a desired incoming tone. After a signal ceases, ringing of the input filter caused by signal is at the peak response points of the input filter at either side of the center frequency, and it is therefore not effective to prolong ringing in the output filter.

*INVENTORS*
ROBERT H. BEEMAN
ROBERT V. BURNS
ROBERT T. CLEARY

BY Glenn H. Antrim
ATTY.

TOME CHANNELS FOR MULTIFREQUENCY RECEIVERS

BACKGROUND OF THE INVENTION

This invention pertains to tone channels of multifrequency receivers and more particularly to means for suppressing in output filters of tone channels ringing which originates in input filters of tone channels.

In the past, interrupted direct-current pulses have usually been employed to operate switching networks in telephone systems. Recently, tone signaling has commonly been used in place of pulses in subscriber signaling. A signaling system including circuits for transmission and reception of tones is described in U.S. Pat. No. 3,076,059 issued to L. A. Meacham et al. on Jan. 29, 1963. The receiver of that system produces output in response to the simultaneous reception of two tones. The validity of the operation of the receiver over interfering signals is obtained by capture effect of limiters used in tone channels, and by the small probability of receiving simultaneously two, and only two, sustained tones of predetermined frequencies.

The use of fast electronic switching between offices has increased the probability of obtaining invalid interoffice signaling when relying merely upon the capture effect of limiters in conjunction with the rejection of interfering signals in tone filters. An improvement for additional guarding against receiver output caused by interfering signals is described in U.S. Pat. No. 3,319,011 issued to Joseph Maurushat, Jr. on May 9, 1967. The signaling system described there includes a timing circuit for testing the duration of received tones before enabling receiver output circuits.

SUMMARY OF THE INVENTION

In addition to the utilization of two tones and timing circuits to test duration of the tones, the present tone channel utilizes an input filter that has frequency characteristics for decreasing the duration of ringing in output filters. Ringing is a train of damped waves present in a resonant filter after applied signal or interference ceases. The frequency of ringing signals is equal to the frequency of the peak response of the frequency characteristic curve of the filter.

The present circuit decreases the duration of undesirable ringing signals that would be present in the output of the tone channel if the peak response of a filter preceding a limiter were at the same frequency as the peak response of a filter in the output circuit of the limiter. In the present tone channel, the input filter has a frequency curve resembling the curve of an overcoupled turning circuit. Its two points of peak response are on opposite sides of its center frequency which is equal to the predetermined frequency of a desired tone. A narrow band-pass filter in the output circuit of the limiter is resonant at the center frequency to pass the desired tone. Since the frequency of the ringing in the input filter is at the frequencies of its peak response after the incoming signal ceases, the continued ringing does not set up substantial ringing in the output filter at the center frequency.

DESCRIPTION OF THE PREFERRED EMBODIMENT

Figure 1:
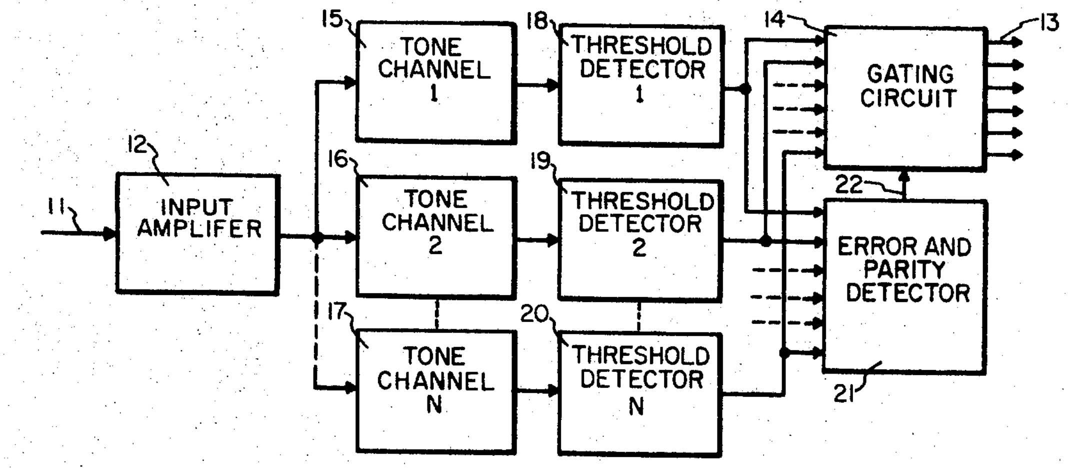
FIG. 1 is a block diagram of a tone receiver having tone channels according to this invention.

The block diagram of FIG. 1 shows major circuits in a receiver which is particularly adaptable to interoffice telephone trunking systems. For example, the input 11 of the amplifier 12 is connected across an incoming trunk for receiving tone signals within the range of voice frequencies. In a preferred embodiment, two selected tones out of six tones of predetermined frequencies are received simultaneously. The frequency of a lowest frequency tone may be 700 Hz., and frequencies of adjacent tones may be separated by 200 Hz. The receiver provides direct current at the output 13 of the gate 14 when two tones only are received. This output current may be applied to a central electronic processing equipment of a local office. Tone receivers are also now commonly used in conjunction with subscriber telephone lines as shown in the U.S. Pat. 3,076,059 referenced above.

In a preferred embodiment, the input amplifier 12, which operates over the range of voice frequencies, has high impedance input and a low impedance output. Normally, two tones are received from a distant tone transmitter for application to the input, but interfering voice signals and transients of high voltage are also present sometimes. The output of the amplifier 12 is connected to the parallel inputs of a plurality of tone channels 15—17. In the preferred example, six tone channels are used, and their outputs are connected to the inputs of the respective threshold detectors 18—20. Each detector develops a direct-current output in response to application of a particular one of the transmitted tones of predetermined frequency from its respective tone channel. A feature of these tone channels is the utilization of special filters to prevent excessive ringing as described below.

The outputs of the detectors 18—20 are connected to respective inputs of the gating circuit 14 and to respective inputs of an error and parity detector 21. An output of the error and parity detector is connected to a control input 22 of the gating circuit 14. The error and parity circuits are logic circuits to test the presence and duration of voltages applied to its inputs from the threshold detectors 18—20. After desired voltages are present from two of the detectors at the end of a timing interval, and no other interfering voltage above the threshold of any other of the detectors 18—20 is present, the proper voltage is applied to the input 22 of the gating circuits 14 to enable the gating circuits to conduct the direct-current outputs present at two of the detectors 18—20 to respective output circuits 13. Although the circuits 14 and 21 generally insure that only valid signals are passed to output circuits, the improvement in the tone channels of the present invention contributes to greater reliability by decreasing the duration of ringing voltages applied to the threshold detectors 18—20.

Figure 2:
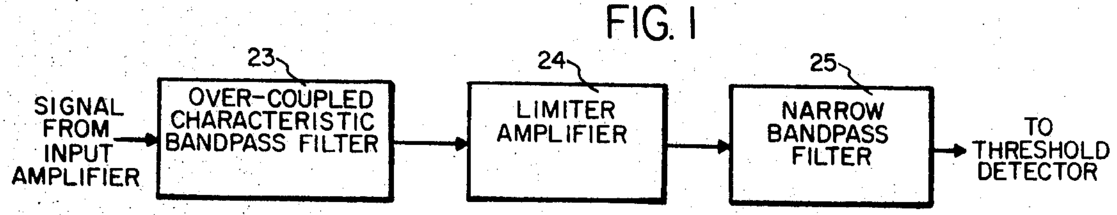
FIG. 2 is a block diagram of any of the tone channels shown in FIG. 1.
Figure 3:
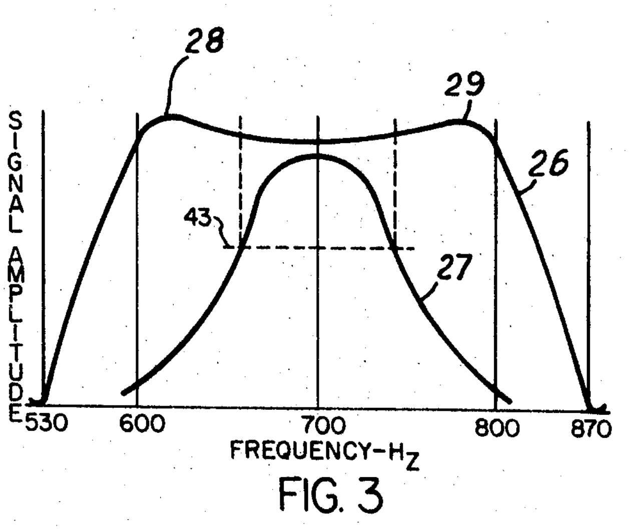
FIG. 3 shows the comparative shapes of typical frequency curves of input and output filters of the tone channels of FIG. 1.

According to FIG. 2, the tone channel has an input filter 23, a limiter-amplifier 24, and an output filter 25 connected in cascade. The input filter 23 has a frequency characteristic according to the curve 26 of FIG. 3, and the output filter 25 has a frequency characteristic according to the curve 27. The curve 26 has a shape similar to the curve of an overcoupled tuning circuit with points of peak response at each side of a center frequency. The curve 27 of the output filter 25 has narrow band-pass characteristics with sufficiently low output at the sides of the center frequency to reject substantially any signals having the same frequency at which the input filter 26 has peak response.

Figures 4A, 4B, 4C, 4D, 4E:
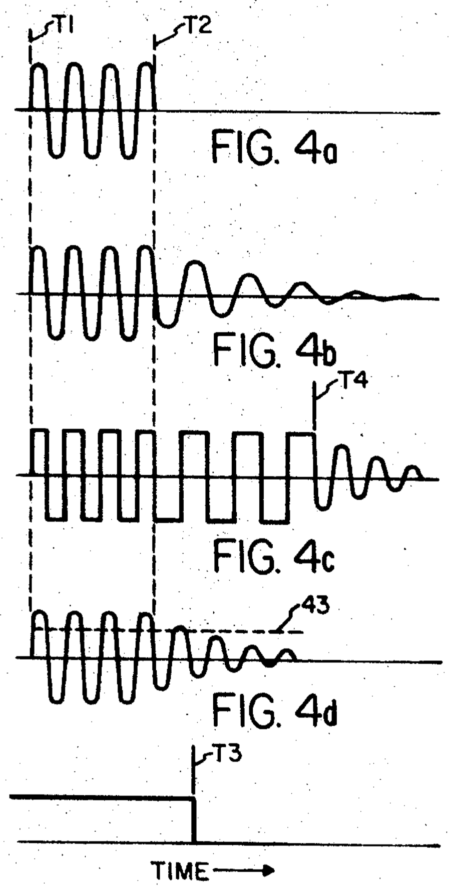
FIGS. 4*a—e* are curves to show the results of ringing in tone channels.

An advantage of using filters as described above in tone channels can be more readily understood with reference to FIGS. 4*a—e*. The curve of FIG. 4*a* illustrates a signal applied to the input filter of a tone channel at its center frequency between time $T_1$ and time $T_2$. However, the voltage appearing across the input filter continues after the time $T_2$ as a damped sine wave or ringing as illustrated in FIG. 4*b*. If this voltage were applied directly to a detector, which does not have a low threshold level compared with the maximum amplitude of the interfering signal, it would cause insignificant output of the detector shortly after the incoming signal ceases. However, in the type of tone channels having the advantage of capture by use of a limiter, the waveform of FIG. 4*b* is amplified and limited to provide the waveform shown in FIG. 4*c* for application to the output filter. Therefore, the ringing continues after time $T_4$ until the output of the input filter decays below the threshold level of a succeeding detector. Briefly, the advantages gained by using a limiter and a threshold detector combination are offset to some extent by what appears to be prolonged ringing.

In the present circuit, the amplified and limited waveform of FIG. 4*c* does not cause prolonged ringing in the output filter 25 (FIG. 2). Since the input filter 23 has the frequency response 26 (FIG. 3), the frequency of the ringing changes from the center frequency at the time $T_2$ to the frequencies at which the curve 26 peaks at points 28 and 29. The signal at the output of the limiter after the time $T_2$ as shown in FIG. 4*c* is decreased in amplitude below the threshold of the detector because it is outside the passband of the output filter. Therefore, as shown in FIG. 4*d*, the voltage across the output filter is rapidly damped after the time $T_2$, and the output, as shown in FIG. 4*e*, of a succeeding threshold detector falls to zero at time $T_3$ when the amplitude of the damped wave at the center frequency falls below the threshold level 43 of the detector.

Figure 5:
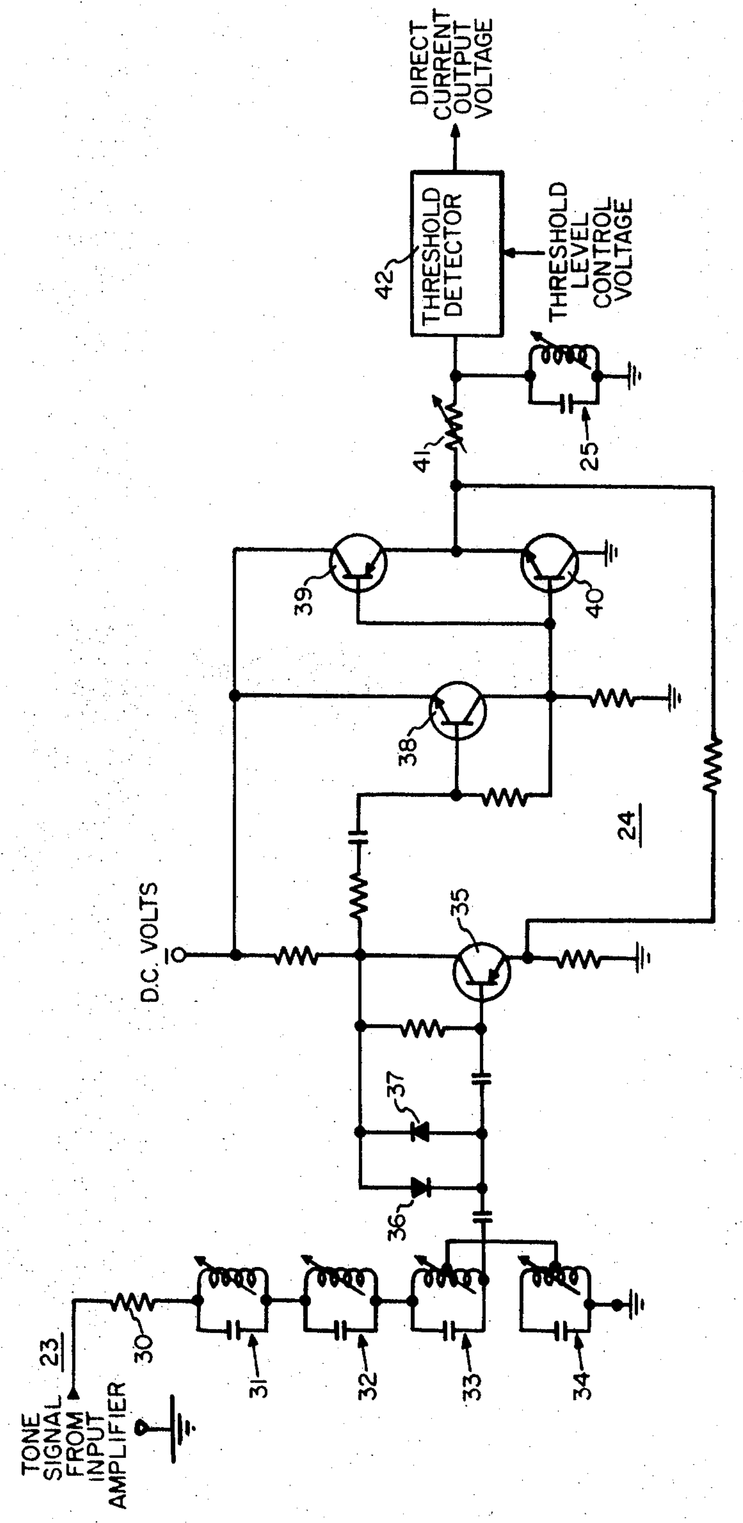
FIG. 5 is a schematic of a preferred embodiment of a tone channel according to the block diagram of FIG. 2.

FIG. 5 is a schematic diagram of the tone channel of FIG. 2 to show particularly a preferred arrangement of the input filter 23. This filter comprises a resistor 30, and antiresonant filter or trap 31, a trap 32, and a band-pass filter section comprising the resonant circuits 33 and 34 connected in series. Each of the resonant circuits has a capacitor in parallel with an inductor tuned in a usual manner by an adjustable slug of magnetic material. In the tone channel for receiving a 700 Hz. tone, trap 31 is tuned to 870 Hz. to provide the steep slope in the high frequency portion of the curve 26 of FIG. 3, and the trap 32 is tuned to 530 Hz. to provide the steep slope in the low frequency portion. Center taps of the inductors in the resonant circuits 33 and 34 are connected together and the end of the inductor opposite the end connected to the trap 32 is coupled to the base of a transistor 35 in a limiter stage. One end of the inductor in the resonant circuit 34 is connected to ground to complete the input circuit which is connected to the resistor 30.

Other capacitive or inductive overcoupled arrangements may be used for the input filter 23. An advantage of the preferred arrangement is that the inductors of the resonant circuits 33 and 34 of the band-pass filter are readily adjusted to provide the points 28 and 29 of peak response shown in FIG. 3. The adjustment of one of the inductors to provide one of the peaks in response curve does not materially affect the adjustment of the other inductor to provide the other peak in the response curve.

The limiter stage following the input filter 23 is a type having diodes 36 and 37 in a feedback circuit to limit the amplitude of the collector voltage of the transistor 35. The limiter is followed by a common emitter amplifier stage having a transistor 38 to drive a complementary emitter follower output stage having the transistors 39 and 40. The output at the emitters is a square wave and is applied through an adjustable resistor 41 to the output filter 25. The resistor 41 is adjusted to provide the proper bandwidth of the output filter 25. The output of the filter is a sine wave for application to a threshold detector 42 corresponding to the detectors 18—20 of FIG. 1.

We claim:

1. A multifrequency receiver comprising:

a plurality of tone channels, the input of each of said tone channels being connected to a common input of said receiver, each of said tone channels being tuned to receive a signal at a respective frequency while rejecting another signal simultaneously applied to said common input to be received by another one of said tone channels that is tuned to a frequency only slightly separated therefrom, said input circuit of each of said tone channels including an input band-pass filter with a narrow band response curve having steep skirts to reject a signal from said other one of said tone channels but with peak characteristics resembling the characteristics of an overcoupled tuning circuit that has a noticeable peak frequency response on each side of its center frequency, its center frequency being the frequency of said signal to be received by the respective tone channel, each of said tone channels having a limiter stage, an output band-pass filter and a threshold detector connected successively in cascade, the input of each of said limiter stages being connected to a respective one of said input band-pass filters, each of said output band-pass filters having a single peak response at said frequency of said signal to be received by the respective tone channel and having a frequency response curve still more narrow than that of said respective input band-pass filter to reject ringing signals which occur at each one of said peak frequencies of said input band-pass filter of said respective tone channel.

2. A multifrequency receiver as claimed in claim 1 in which each of said input band-pass filters comprise a pair of adjustable resonant circuits, each of said resonant circuits having a center-tapped inductor, the center taps of said inductors being connected together, one end terminal of one of said inductors being connected to one terminal of said common input circuit, a trap circuit, one end terminal of the other of said inductors being connected through said trap circuit to the other terminal of said common input circuit, said trap circuit being tuned to frequencies adjacent to the center frequency of said resonant circuits to effectively sharpen the skirts of their frequency response curve, and the other end terminal of one of said resonant circuits being connected to said limiter of the respective tone channel.